US006304581B1

(12) United States Patent
Chen et al.

(10) Patent No.: US 6,304,581 B1
(45) Date of Patent: Oct. 16, 2001

(54) INTERLEAVING METHOD AND APPARATUS FOR ORTHOGONAL TRANSMIT DIVERSITY AND MULTI-CARRIERS CDMA COMMUNICATION SYSTEMS

(75) Inventors: Jiangnan Chen, Darien; Louay Jalloul, Palatine, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/503,021

(22) Filed: Feb. 14, 2000

Related U.S. Application Data

(60) Provisional application No. 60/120,084, filed on Feb. 16, 1999.

(51) Int. Cl.[7] .................................................. H04J 13/00
(52) U.S. Cl. ........................ 370/479; 370/320; 370/335; 370/441; 370/342
(58) Field of Search ............................ 370/320, 334, 370/335, 342, 441, 479; 375/262, 265, 267, 299; 714/701, 702, 756

(56) References Cited

U.S. PATENT DOCUMENTS 5,136,588 * 8/1992 Ishijima ................................ 714/701
5,659,580 * 8/1997 Partyka ................................. 375/295
6,064,664 * 5/2000 Kim ...................................... 370/335

OTHER PUBLICATIONS

Rohani, "Performance Analysis of CDMA Transmit Diversity Methods", IEEE, pp. 1326–1330, Apr. 1999.*

* cited by examiner

Primary Examiner—Wellington Chin
Assistant Examiner—Frank Duong
(74) Attorney, Agent, or Firm—Kenneth A. Haas

(57) ABSTRACT

A communication system provides a method and apparatus for interleaving data symbols of a block of data symbols (301) having data symbols from B(1) to B(n). The method and the accompanying apparatus include dividing block of data symbols (301) into a plurality of groups of data symbols (303 and 304). Each of the plurality of groups of data symbols (303, 304) includes data symbols equal in number to a fraction of data symbols B(1) through B(n), such as ½ and ⅓, such that the total number of data symbols in plurality of groups of data symbols (303, 304) substantially equals "n" data symbols. An interleaved block of data symbols (106) is formed by an alternating selection of data symbols from plurality groups of data symbols (303, 304). The alternating selection from each of plurality of groups of data symbols (303, 304) is according to either a forward addressing or a backward addressing mapping. A plurality of coded data symbols in a block of coded data symbols (104) is received for interleaving according to a single bit reversal interleaving function to form block of data symbols (301).

20 Claims, 4 Drawing Sheets

128X3 BIT REVERSE INTERLEAVER

CURRENT INTERLEAVING SCHEME FOR OTD

INTERLEAVING METHOD AND APPARATUS FOR ORTHOGONAL TRANSMIT DIVERSITY AND MULTI-CARRIERS CDMA COMMUNICATION SYSTEMS

The present application is based on Provisional U.S. application No. 60/120,084, filed on Feb. 16, 1999, which is hereby incorporated by reference, and priority thereto for common subject matter is hereby claimed.

BACKGROUND OF THE INVENTION

The invention relates to the field of communications and communication systems, more particularly, to a code division multiple access (CDMA) communication system.

Orthogonal transmit diversity (OTD) is a feature of a CDMA communication system implemented for improving performance of a communication link between a base station and a mobile station. The commonly known IS-2000 standard provides a detailed description for implementation and use of an OTD feature in a CDMA communication system. A copy of the IS-2000 standard may be obtained by contacting Telecommunications Industry Association, 2500 Wilson Blvd., Suite 300, Arlington, Va. 22201 USA, or visiting a world web site on the internet located at http://www.tiaonline.org/, which incorporated by reference herein. The OTD feature is applicable for both single carrier CDMA system and multi-carriers (MC) CDMA system.

Generally speaking, information data in a CDMA system is coded according to a coding rate. For example, coding rates of ⅓, ½ and ¼ are commonly used in CDMA systems operating according to IS-2000 standards; other coding rates are also available. For example, when the information data is coded according to a ⅓ coding rate, the encoder produces 3 data symbols for every input information data bit, similarly for other encoding rates. One ordinary skilled in the art may appreciate that data symbol and data bit are interchangeable terms. After the information data has been encoded, the encoded symbols are transmitted to a receiving unit for decoding and recovery of the information data bits. The transmission of data normally takes place over a channel with varying propagation characteristics. As a result, if the encoded symbols are transmitted sequentially from a transmitting source such that all or most of the encoded symbols experience the same or similar propagation characteristics in the transmission channel, the information data may not be decoded or recovered at the receiver due to severe degradation in the received signal energy of all or most of the encoded symbols.

The OTD provides a method for transmission of encoded symbols such that, as much as possible, each encoded data symbol of an information data bit experiences a propagation characteristics independent of other encoded symbols of the same information data bit. As such, the possibility of degrading all or most of the encoded data symbols of the same information data bit due to a varying propagation channel characteristics is spread and minimized. A system implementing the OTD feature transmits encoded data symbols of an information data bit from at least two transmit antennas, such that one encoded symbol is transmitted from one antenna and another encoded symbol from another antenna. The encoded symbols transmitted from each antenna are spread using an orthogonal Walsh code different than the Walsh code used for the encoded symbols transmitted from the other antenna. A mobile station, or a remote receiving unit, receiving both signals obtains a reception diversity improvement by allowing the decoder to process a group of symbols that have faded independently. In order to ensure that coded symbols from the same information data bit fade independently in transmission, use of two parallel interleavers in the transmitter may be required according to the description provided in the earlier versions of IS-2000 standard and related literatures. Referring to FIG. 1, a CDMA communication system transmitter block diagram 100 is shown. Raw information data bits are added with CRC bits and some other tail data bits in a block 101 to produce information data bits 102. Information data bits 102 are fed to a channel encoder 103 for encoding according to an encoding rate to produce encoded symbols 104. In case of implementing an OTD feature, the encoded symbols 104 are fed to an OTD interleaver 105; otherwise, the encoded symbols 104 are fed to a single interleaver before further processing of the transmit signal. After interleaving, interleaved symbols 106 are produced. Interleaved symbols 106 pass through a transmit signal processing block 107 which may include long code masking, power control operation and power control puncturing operations; such operations are well known in the art and more specifically explained in the IS-2000 standard. Block 107 produces data symbols 108 which pass through a data splitter 109 to produce two streams of data symbols 110 and 111. The data symbols 110 and 111 are modulated independently in QPSK modulators 112 and 113 and up-converted to an appropriate carrier frequency before transmission from antennas 114 and 115. On a receiving end both signals transmitted from antennas 114 and 115 are demodulated, decoded and combined to recover the information data bits.

The OTD interleaver 105 requires at least two data block interleavers 120 and 121. The information data bits 102 are normally transmitted in a block of data format, as such, the encoded symbols are also in a block of encoded symbols format. Normally, a block of information data bits is set to occupy a predefined time frame. The number of information data bits in a time frame varies depending on the information data bit rate. Time frames of 5, 10, 20, 40 and 80 mSec. are possible. The information data rate also may vary from 9.6 kbps up to 460.8 kbps. Calculating the number of information data bits or encoded symbols in a time frame is well known by one ordinary skilled in the art. Similarly, the number of encoded symbols depends on the encoding rate and the number of information data bits in a time frame. For example, one block of encoded symbols 104 in a 20 mSec time frame may include 384 encoded symbols for an information data bit rate 9.6 Kbps in a 20 mSec time frame using an encoding rate of ½.

A block of encoded symbols 104 are de-muxed in a de-mux block 122 to produce two halves, blocks of symbols 123 and 124 which have the same time frame and equal to the time frame of the block of encoded symbols 104. The number of symbols in each block of symbols 123 and 124 is equal to one half of the encoded symbols in the block of encoded symbols 104. Two data block interleavers 120 and 121 according to a prior art provide the interleaving functions for interleaving each block of symbols 123 and 124. If the number of encoded symbols in the block of encoded symbols 104 is equal to "N", the number of symbols in each block 123 and 124 is equal to "N/2". As a result, the interleavers 120 and 121 perform interleaving functions for "N/2" symbols. The operation of interleaving is according to a known and predetermined algorithm. Such algorithm often may be governed by a mathematical relationship mapping the input to output symbols. The interleavers 120 and 121 then output interleaved symbols 125 and 126 of block of encoded symbols 123 and 124. The OTD interleaver 105 may additionally for improving performance may include a circular shift operation 127 shifting data symbols by a predetermined number. The circular shift function 127 shifts the data symbols of, in this case, the interleaved symbols 126 to produce data symbols 128. Data symbols 128 and 125 are muxed in a mux-ing block 129 to produce interleaved symbols 106.

Referring to FIG. 2, a case of multi-carrier (MC) CDMA communication system, the OTD MC interleaver 201 may be used. Interleaver 201 inputs encoded symbols 104 and outputs interleaved symbols 106 according to its internal OTD operations. A block of input encoded symbols is de-muxed into three blocks 202, 203 and 204 in a demux-ing block 205 for multi-carrier CDMA system with three CDMA carriers. Each block of symbols 202, 203 and 204 pass through an interleaver block respectively shown as interleaver blocks 206, 207 and 208 to produce interleaved blocks of symbols 209, 210 and 211 respectively. Interleaved symbols 210 and 208 pass through circular shift operations 212 and 213 to produce symbols 214 and 215. Symbols 209, 214 and 215 are muxed in a mux-ing operation 216 to produce interleaved symbols 106. In case of OTD-MC interleaver 201, the data splitter 109 splits the data block into three blocks of data for transmission from up to three transmit antennas. The modulation and frequency up-conversion of transmission may be performed independently for three carrier frequencies. Each carrier may be transmitted from a respective antenna, or two carries from one antenna and the third one from a second antenna.

As shown in FIGS. 1 and 2, the prior art requires at least two block interleavers, and in case of MC-OTD, at least three block interleavers. The operations within such block interleavers are intensive and are often governed by one or more mathematical relationships to map the data symbols of an input block of data symbols to data symbols of an output block of data symbols, in addition to other operations such as muxing, de-muxing and circular shifts operations. As such, operations relating to multiple block interleavers take extensive hardware and software resources.

Therefore, there is a need for a method and apparatus for providing OTD feature in a CDMA communication system without a requirement of multiple block interleavers.

SUMMARY OF THE INVENTION

An aspect of the present invention is a method in a communication system for interleaving a block (of data symbols including data symbols from B(1) to B(n). The method comprises the steps of separating the block of data symbols into a plurality of groups of data symbols, wherein each of the plurality of groups of data symbol includes data symbols equal in number to a fraction of data symbols B(1) through B(n), wherein the fraction is either one-half or one-third; and forming an interleaved block of data symbols by making a sequential selection of a data symbol from each Of said plurality of groups of data symbols until all data symbols of the block of data symbols have been selected.

Another, aspect of the present invention is a method in a communication system for interleaving a block of data symbols including data symbols from B(1) to B(n). The method comprises the steps of separating the block of data symbols into first and second groups of data symbols, wherein the first group of data symbols includes data symbols from B(1) to B(n/2), and the second group of data symbols includes data symbols from B(n/2+1) to B(n); and forming an interleaved block of data symbols by making a sequential selection of a data symbol from each of said first and second groups of data symbols until all data symbols of the block of data symbols have been selected.

A third aspect of the present invention is a method in a communication system for interleaving a block of data symbols including data symbols from B(1) to B(n). The method comprises the steps of dividing the block of data symbols into first, second, and third groups of data symbols, wherein the first group of data symbols includes data symbols from B(1) to B(n/3), the second group of data symbol includes data symbols from B(n/3+1) to B(2n/3), and the third group of data symbols includes data symbols from B(2n/3+1) to B(n); and forming an interleaved block of symbols by making a sequential selection of a data symbol from each of said first, second, and third groups of data symbols until all data symbols of the block of data symbols have been selected.

A fourth aspect of the present invention is an apparatus in a communication system for interleaving a block of data symbols including data symbols B(1) to B(n). The apparatus comprises means for separating the block of data symbols into a plurality of groups of data symbols, wherein each of the plurality of groups of data symbols includes data symbols equal in number to a fraction of data symbols B(1) through B(n), wherein the fraction is either one-half or one-third; and means for forming an interleaved block of data symbols by making a sequential selection of a data symbol from each of said plurality of groups of data symbols until all data symbols of the block of data symbols have been selected.

DETAILED DESCRIPTION OF THE PREFERRED EMBODIMENT(S)

Broadly speaking, various aspects of the invention in a communication system include a method and apparatus for interleaving data symbols of a block of data symbols having data symbols from B(1) to B(n). The method and the accompanying apparatus include dividing the block of data symbols into a plurality of groups of data symbols. Each of the plurality of groups of data symbols includes data symbols equal in number to a fraction of data symbols B(1) through B(n), such that the total number of data symbols in the plurality of groups of data symbols substantially equals "n" data bits. Furthermore, an interleaved block of data symbols is formed by an alternating selection of data symbols from the plurality groups of data symbols. The alternating selection from each of the plurality of groups of data symbols is according to either a forward addressing or a backward addressing mapping. According to various aspects of the invention, a plurality of coded data symbols in a block of coded data symbols is received for interleaving according to a single bit reversal interleaving function to form the block of data symbols.

Figure 3:
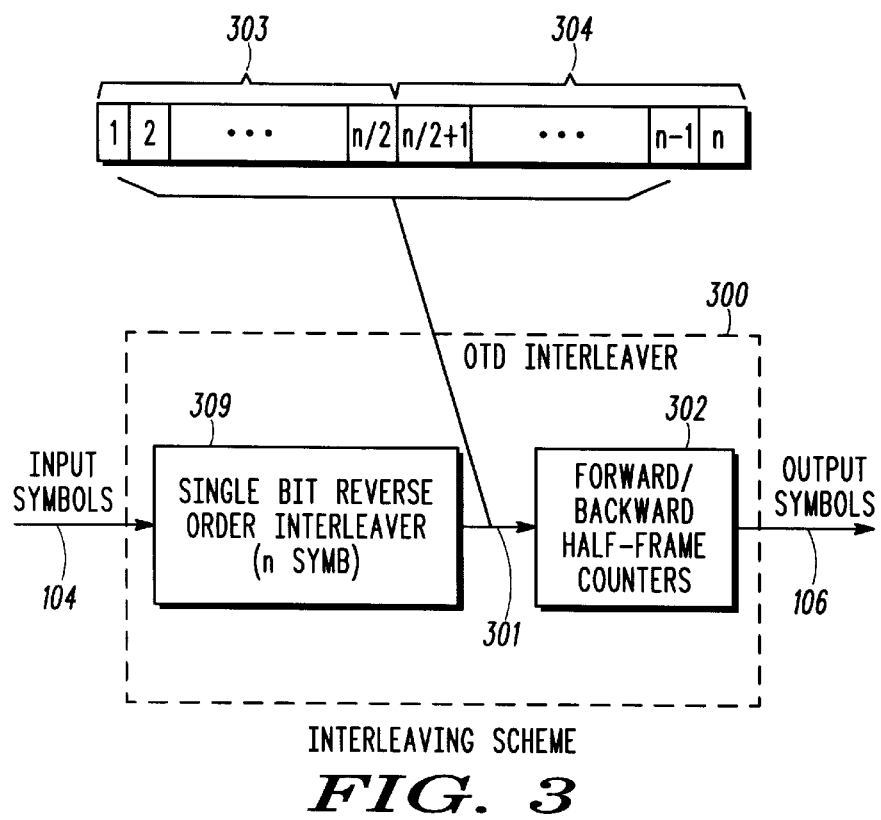
FIG. 3 depicts an OTD interleaver block diagram according to various aspects of the invention.

More specifically, referring to FIG. 3, an OTD interleaver 300 block diagram according to various aspects of the invention is shown. The OTD interleaver 300 may be a direct substitute for the prior art OTD interleaver 105 shown in FIG. 1. In a communication system, such as a CDMA communication system, a method and apparatus for interleaving data symbols of a block of data symbols 301 that includes data symbols from B(1) to B(n), according to various aspects of the invention, includes dividing block of data symbols 301 into a first and second groups of data symbols 303 and 304. First group of data symbols 303 includes data symbols from B(1) to B(n/2), and second group of data symbols 304 includes data symbols from B(n/2+1) to B(n). An interleaved block of data symbols 106 is formed by an alternating selection of data symbols from first and second groups of data symbols 303 and 304 by a symbol counter 302. The alternating selection of data symbols by symbol counter 302 begins in first group of data symbols 303 beginning from the B(1) data symbol and alternating to second group of data symbols 304 beginning from the B(n) data symbol. Furthermore, the alternating selection ends with the data symbol B(n/2) in first group of data symbols 303 and the data symbol B(n/2+1) in second group of data symbols 304.

The alternating selection of data symbols from first group of data symbols 303 is according to a forward addressing beginning from the B(1) to B(n/2) data symbols, such that after selection of the B(1) data symbol, a data symbol B(2) is selected the next time the selection is from first group of data symbols 303. The alternating selection of data symbols from second group of data symbols 304 is according to a backward addressing beginning from the B(n) to B(n/2+1) data symbols, such that after selection of the data symbol B(n), a data symbol B(n−1) is selected the next time the selection is from second group of data symbols 304.

Various aspects of the invention further includes receiving a plurality of coded data symbols 104 in a block of coded data symbols, and interleaving by an interleaver 309 block of coded data symbols 104 according to a single bit reversal interleaving function to form block of data symbols 301. The bit reversal interleaver 309 input symbols are written sequentially at addresses, $N_{in}$ from 0 to block length minus 1, then the symbols are read out of the interleaver from addresses $N_{out}=2^m(N_{in} \bmod N)+\text{Bit\_Rev}_m(\lfloor N_{in}/N \rfloor)$, where $\lfloor x \rfloor$ denotes the largest integer less than or equal to x, and $\text{Bit\_Rev}_m(y)$ denotes the bit-reversed m-bit value of y.

Figure 4:
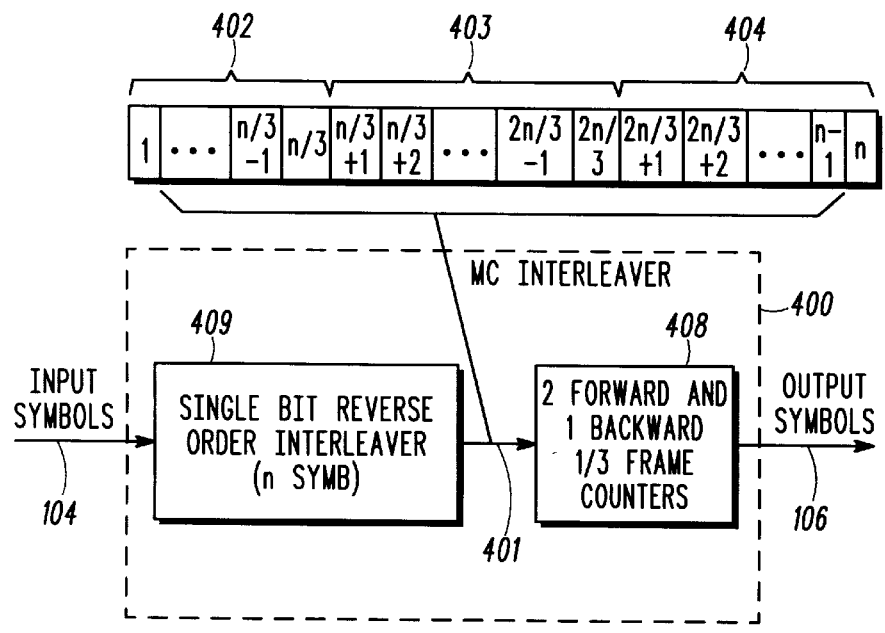
FIG. 4 depicts an MC-OTD interleaver according to various aspects of the invention for a case of multi-carriers (MC) CDMA communication system.

Referring to FIG. 4, an MC-OTD interleaver 400 for a case of multi-carriers (MC) CDMA communication system is shown. The MC-OTD interleaver 400 may be a direct substitute for the prior art MC-OTD interleaver 201 shown in FIG. 2. According to various aspects of the invention, interleaving data symbols of a block of data symbols 401 having data symbols from B(1) to B(n) includes dividing block of data symbols 401 into a first, second and third groups of data symbols 402, 403 and 404 respectively. First group of data symbols 402 includes data symbols from B(1) to B(n/3), second group of data symbols 403 includes data symbols from B(n/3+1) to B(2n/3), and third group of data symbols 404 includes data symbols from B(2n/3+1) to B(n). An interleaved block of symbols 106 is formed by an alternating selection of data symbols from first, second and third groups of data symbols 402–404 by a data symbol counter 408. The alternating selection of data symbols begins in first group of data symbols 402 beginning from the B(1) data symbol, alternating to second group of data symbols 403 beginning from the B(2n/3+1) data symbol and alternating next to third group of data symbols 404 beginning from the B(n) data symbol. The alternating selection ends with the B(n/3) data symbol in first group of data symbols 402, the B(2n/3) data symbol in second group of data symbols 403 and the B(2n/3+1) data symbol in third group of data symbols 404.

The alternating selection of data symbols from first group of data symbols 402 is according to a forward addressing beginning from the B(1) to B(n/3) data symbols; such that after the data symbol B(1) is selected, the next selection from first group of data symbols 402 includes the data symbol B(2). The alternating selection of data symbols from second group of data symbols 403 is according to a forward addressing beginning from the B(n/3+1) to B(2n/3) data symbols, such that after the data symbol B(n/3+1) is selected, the next selection from second group of data symbols 403 includes the data symbol B(n/3+2). In an alternative embodiment, the alternating selection of data symbols from second group of data symbols 403 is according to a backward addressing beginning from the B(2n/3) to B(n/3+1) data symbols. The alternating selection of data symbols from third group of data symbols 404 is according to a backward addressing beginning from the B(n) to B(2n/3+1) data symbols, such that after the data symbol B(n) is selected, the next selection from third group of data symbols 404 is the data symbol B(n−1).

Various aspects of the invention further includes receiving a plurality of coded data symbols 104 in a block of coded data symbols by an interleaver 409, and interleaving block of coded data symbols 104 according to a single bit reversal interleaving function to form block of data symbols 401. The bit reversal interleaver 409 input symbols are written sequentially at addresses, $N_{in}$ from 0 to block length minus 1, then the symbols are read out of the interleaver from addresses $N_{out}=2^m(N_{in} \bmod N)+\text{Bit\_Rev}_m(\lfloor N_{in}/N \rfloor)$, where $\lfloor x \rfloor$ denotes the largest integer less than or equal to x, and $\text{Bit\_Rev}_m(y)$ denotes the bit-reversed m-bit value of y.

Generally, the invention includes in various aspects, an interleaving method and accompanying apparatus for implementing an OTD feature of a CDMA communication system. A single bit reversal interleaver is used followed by a forward/backward addressing scheme. The interleaved symbols are grouped in a specific order. Two counters may be used to get the addresses of the output symbols. The first counter points to the beginning of the interleaved symbols and is incremented while the second counter points to the end of the interleaved symbols and is decremented. The two symbols are then sent consecutively. In a case of MC-OTD system, the grouping of the symbols after the interleaver may include 3 counters, the first and second counter point to the beginning and ⅔ of the interleaved symbols, respectively, and are incremented. The third counter points to the end of the interleaved symbols and is decremented. The advantages of the invention include absence of a requirement for any antenna swapping function or cyclic shifts to mitigate the effect of correlated antenna fading while ensuring consecutive coded symbols are not punctured due to the reverse power control sub-channel.

Figure 5:
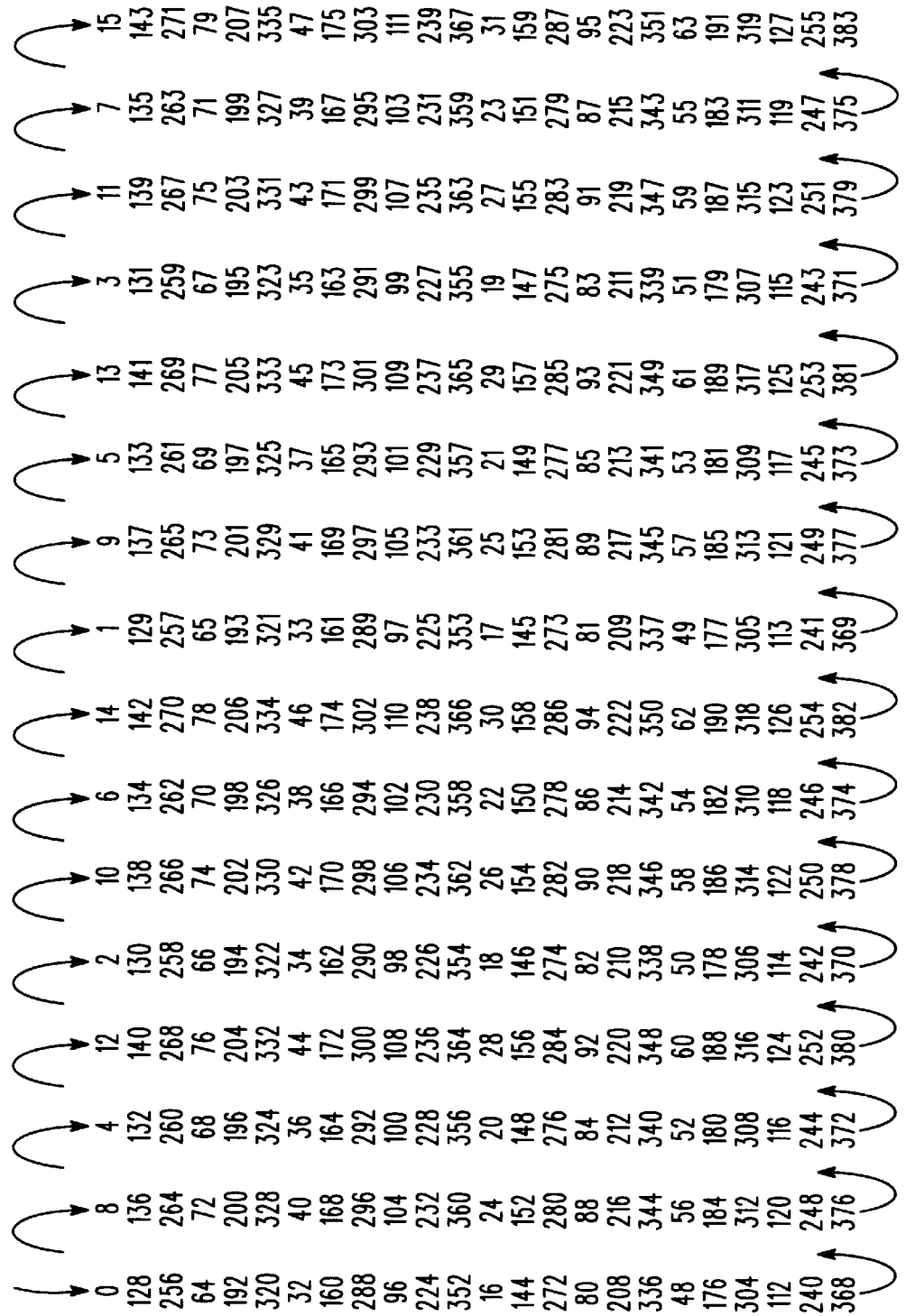
FIG. 5 depicts for m=7 and N=3 a matrix of data symbols where each number shown represents an input address, and the location in the matrix is with respect to other data symbols at an output. The arrows indicate the order of the each entry in the matrix.

The bit reversal interleaver input symbols are written sequentially at addresses, $N_{in}$ from 0 to block length minus 1, then the symbols are read out of the interleaver from addresses $N_{out}=2^m(N_{in} \bmod N)+\text{Bit\_Rev}_m(\lfloor N_{in}/N \rfloor)$, where $\lfloor x \rfloor$ denotes the largest integer less than or equal to x, and Bit_Revm(y) denotes the bit-reversed m-bit value of y. The interleaver parameters are listed in Table 1 Appendix for various data rates. An example is shown in FIG. 5 for m=7 and N=3. Each number shown in the matrix of FIG. 5 represents a symbol address in an input block of data. The location where is shown in the matrix is with respect to other data symbols in an output block of data symbols.

Figure 1:
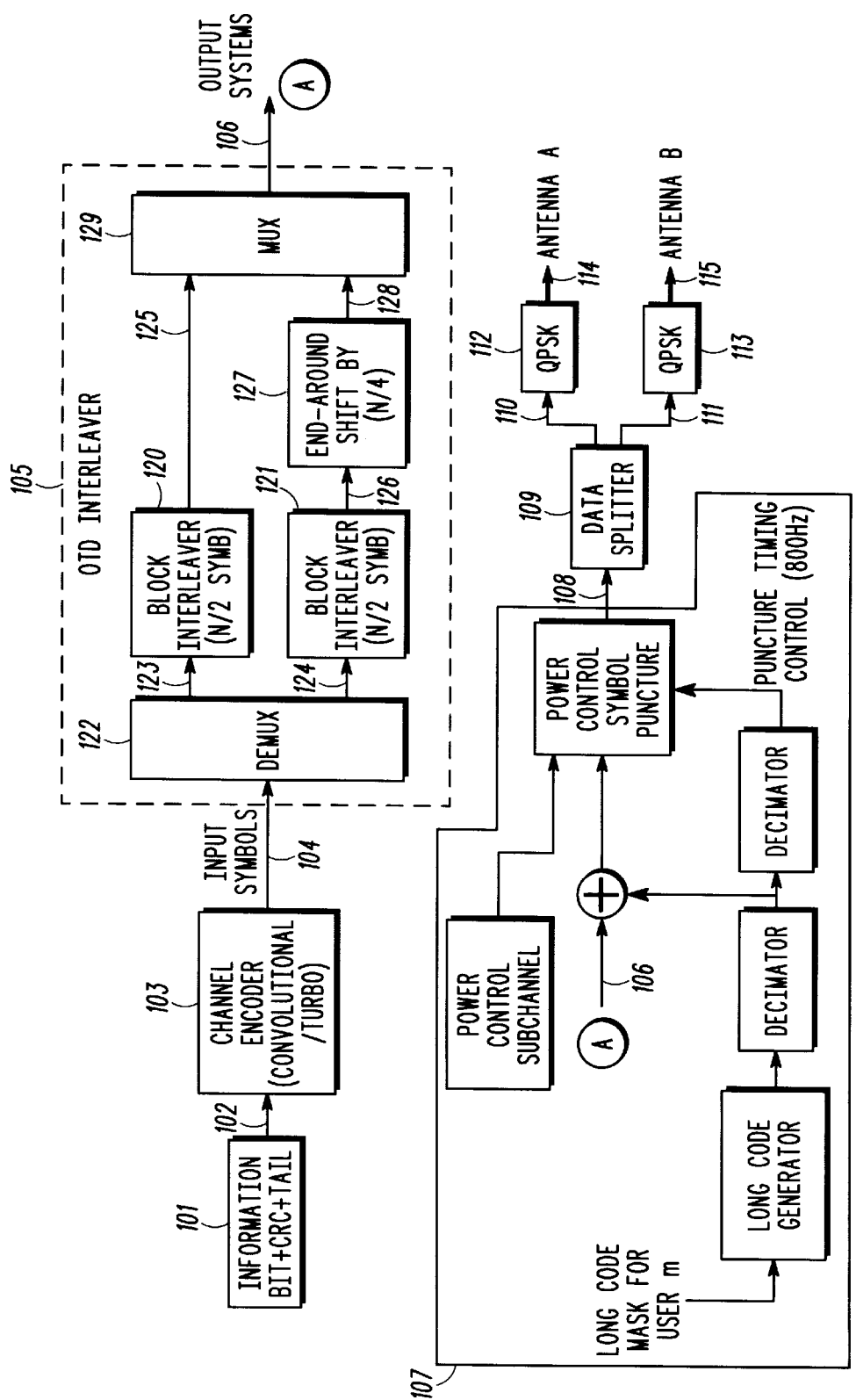
FIG. 1 depicts a CDMA communication system transmitter block diagram having an OTD interleaver block according to prior art.
Figure 2:
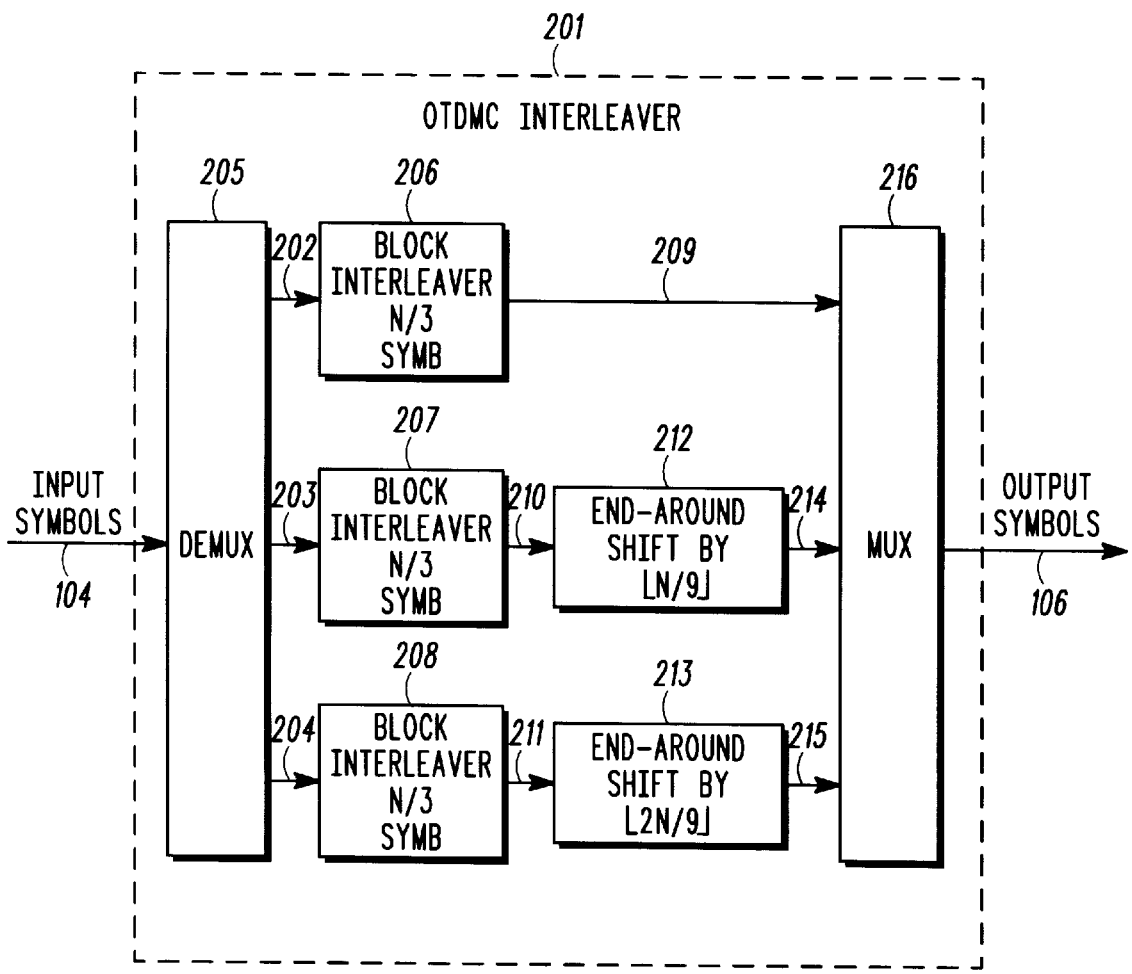
FIG. 2 depicts a case of multi-carrier (MC) CDMA communication system having an OTD MC interleaver according to prior art.

From FIG. 1 and FIG. 2 one ordinary skilled in the art may notice that the implementation of interleaver 105 from the transmitter side which may be a base station may include the following steps:

Decide if it is in OTD mode and determine the interleaver size.

Demultiplex the input symbols into two memory locations, even bits go to M1 and odd bits go to M2.

Assume that you can share the same bit reversal interleaver for the two segments of the data. Once the read address is generated, even bits go to M1, and odd bits go to M2.

Do the half block (N/4) shifting on M2.

Then multiplex back the two data streams into one stream. Due to the number of frame sizes to be implemented, the addressing schemes for various memory locations on M1 and M2 need to be flexible enough to meet all frame sizes.

For the interleaving method and apparatus according to various aspects of the invention, the transmitter side, for example Base Station, may perform the following steps:

Determine the interleaver size.

Perform bit reversal interleaving.

Read the interleaved data from both ends (beginning and end) On the receiving side, for example Mobile Station, to de-interleave the incoming data stream, the Mobile Station needs to go through the same procedures in a reverse order. One ordinary skilled in the art may appreciate that interleaving/de-interleaving method and apparatus according to various aspects of the invention includes fewer steps than prior art method and apparatus. The same applies to the MC-OTD case. As a result, the data symbol interleaving according to various aspects of the invention has the advantage of lower complexity.

TABLE 1

| INTERLEAVER PARAMETERS | | |
|---|---|---|
| INTERLEAVER SIZE | m | N |
| 48 | 4 | 3 |
| 96 | 5 | 3 |
| 192 | 6 | 3 |
| 384 | 7 | 3 |
| 768 | 7 | 6 |
| 1536 | 7 | 12 |
| 3072 | 7 | 24 |
| 6144 | 8 | 24 |
| 12288 | 8 | 48 |
| 72 | 3 | 9 |
| 144 | 4 | 9 |
| 288 | 5 | 9 |
| 576 | 6 | 9 |
| 1152 | 7 | 9 |
| 2304 | 7 | 18 |
| 4608 | 8 | 18 |
| 9216 | 8 | 36 |
| 18432 | 9 | 36 |
| 36384 | 9 | 72 |
| 73728 | 10 | 72 |

TABLE 1-continued

| INTERLEAVER PARAMETERS | | |
|---|---|---|
| INTERLEAVER SIZE | m | N |
| 147456 | 10 | 144 |
| 128 | 7 | 1 |

What is claimed is:

1. In a communication system, a method for interleaving a block of data symbols including data symbols from B(1) to B(n) comprising the steps of:

separating said block of data symbols into a plurality of groups of data symbols, wherein each of said plurality of groups of data symbols includes data symbols equal in number to a fraction of data symbols B(1) through B(n), wherein said fraction is either one-half or one-third; and forming an interleaved block of data symbols by alternately selecting one of said plurality of groups of symbols and sequentially selecting, with respect to said selected one of said plurality of groups of symbols, a data symbol from within said selected one of said plurality of groups of symbols until all data symbols of the block of data symbols have been selected.

2. The method as recited in claim 1, wherein said step of sequentially selecting, with respect to said selected one of said plurality of groups of symbols, a data symbol from within said selected one of said plurality of groups of symbols is performed according to either a forward addressing or a backward addressing mapping.

3. The method as recited in claim 1, further comprising the steps of:

receiving a plurality of coded data symbols in a block of coded data symbols; and interleaving said block of coded data symbols according to a single bit reversal interleaving function to form said block data symbols.

4. In a communication system, a method for interleaving a block of data symbols including data symbols from B(1) to B(n), comprising the steps of:

separating said block of data symbols into first and second groups of data symbols, wherein said first group of data symbols includes data symbols from B(1) to B(n/2), and said second group of data symbols includes data symbols from B(n/2+1) to B(n); and forming an interleaved block of data symbols by alternately selecting said first and second groups of data symbols and sequentially selecting, with respect to said selected one of said first and second groups of data symbols, a data symbol from within said selected one of said first and second groups of data symbols until all data symbols of the block of data symbols have been selected.

5. The method as recited in claim 4 wherein said step of alternately selecting and sequentially selecting starts in said first group of data symbols, beginning from said B(1) data symbol, and alternates to said second group of data symbols, beginning from said B(n) data symbol.

6. The method as recited in claim 5 wherein said step of alternately selecting and sequentially selecting ends with said data symbol B(n/2) in said first group of data symbols and said data symbol B(n/2+1) in said second group of data symbols.

7. The method as recited in claim 4 wherein said step of alternately selecting and sequentially selecting, with respect to said first group of data symbols, is according to a forward addressing that proceeds from said B(1) data symbol to said B(n/2) data symbol.

8. The method as recited in claim 4 wherein said step of alternately selecting and sequentially selecting, with respect to said second group of data symbols, is according to a backward addressing that proceeds from said B(n) data symbol to said B(n/2+1) data symbol.

9. The method as recited in claim 4, further comprising the steps of:
   receiving a plurality of coded data symbols in a block of coded data symbols; and
   interleaving said block of coded data symbols according to a single bit reversal interleaving function to form said block of data symbols.

10. In a communication system, a method for interleaving a block of data symbols including data symbols from B(1) to B(n), comprising the steps of:
   separating said block of data symbols into first, second, and third groups of data symbols, wherein said first group of data symbols includes data symbols from B(1) to B(n/3), said second group of data symbols includes data symbols from B(n/3+1) to B(2n/3), and said third group of data symbols includes data symbols from B(2n/3+1) to B(n); and
   forming an interleaved block of data symbols by alternately selecting said first, second, and third groups of data symbols and sequentially selecting, with respect to said selected one of said first, second, and third groups of data symbols, a data symbol from within said selected one of said first, second, and third groups of data symbols until all data symbols of the block of data symbols have been selected.

11. The method as recited in claim 10 wherein said step of alternately selecting and sequentially selecting starts in said first group of data symbols beginning from said B(1) data symbol and proceeds to said second group of data symbols beginning from said B(2n/3) data symbol and then proceeds to said third group of data symbols beginning from said B(n) data symbol.

12. The method as recited in claim 10 wherein said step of alternately selecting and sequentially selecting ends with said B(n/3) data symbol in said first group of data symbols, said B(2n/3) data symbol in said second group of data symbols, and said B(2n/3+1) data symbol in said third group of data symbols.

13. The method as recited in claim 10, further comprising the steps of:
   receiving a plurality of coded data symbols; and
   interleaving said plurality of coded data symbols according to a single bit reversal interleaving function to form said block of data symbols.

14. The method as recited in claim 10, wherein said step of alternately selecting and sequentially selecting, with respect to said first group of data symbols, is performed according to a forward addressing that proceeds from said B(1) data symbol to said B(n/3) data symbol.

15. The method as recited in claim 10, wherein said step of alternately selecting and sequentially selecting, with respect to said second group of data symbols, is performed according to a forward addressing that proceeds from said B(n/3+1) data symbol to said B(2n/3) data symbol.

16. The method as recited in claim 10, wherein said step of alternately selecting and sequentially selecting, with respect to said second group of data symbols, is according to a backward addressing that proceeds from said B(2n/3) data symbol to said B(n/3+1) data symbol.

17. The method as recited in claim 10, wherein said step of alternately selecting and sequentially selecting, with respect to said third group of data symbols, is according to a backward addressing that proceeds from said B(n) data symbol to said B(2n/3+1) data symbol.

18. In a communication system, an apparatus for interleaving a block of data symbols including data symbols from B(1) to B(n) comprising:
   means for separating said block of data symbols into a plurality of groups of data symbols, wherein each of said plurality of groups of data symbols includes data symbols equal in number to a fraction of data symbols B(1) through B(n), wherein said fraction is either one-half or one-third; and
   means for forming an interleaved block of data symbols by alternately selecting one of said plurality of groups of symbols and sequentially selecting, with respect to said selected one of said plurality of groups of symbols, a data symbol from within said selected one of said plurality of groups of symbols until all data symbols of the block of data symbols have been selected.

19. The apparatus as recited in claim 18, wherein said means for sequentially selecting, with respect to said selected one of said plurality of groups of symbols, a data symbol from within said selected one of said plurality of groups of symbols further includes means for sequentially selecting, with respect to said selected one of said plurality of groups of symbols, a data symbol from within said selected one of said plurality of groups of symbols according to either a forward addressing or a backward addressing mapping.

20. The apparatus as recited in claim 18, further comprising:
   means for receiving a plurality of coded data symbols in a block of coded data symbols; and
   means for interleaving said block of coded data symbols according to a single bit reversal interleaving function to form said block of data symbols.

* * * * *